United States Patent

[11] 3,610,189

[72] Inventor William A. Doebling
Columbus, Ind.
[21] Appl. No. 761
[22] Filed Jan. 5, 1970
[23] Division of Ser. No. 796,043, Feb. 3, 1969, abandoned.
[45] Patented Oct. 5, 1971
[73] Assignee Arvin Industries, Inc.
Columbus, Ind.

[54] METHOD OF MAKING A MITER JOINT
5 Claims, 6 Drawing Figs.
[52] U.S. Cl. .................................................. 113/116
[51] Int. Cl. .................................................. B21d 53/74
[50] Field of Search ........................................... 113/116
HA, 116 HH, 116 F, 116 G; 29/476.5; 287/189.36 H

[56] References Cited
UNITED STATES PATENTS
319,305  6/1885  Paige ............................ 113/116 HA
991,137  5/1911  Chesnutt ....................... 113/116 HA
1,836,354  12/1931  Abrams ........................ 287/189.36 H
2,241,266  5/1941  Mayne et al. ................. 113/116 HA Primary Examiner—Richard J. Herbst
Attorney—Trask, Jenkins & Hanley ABSTRACT: A mitered corner for a strip of molding in which the edges of the said corner closely abut each other. A strip of L-shaped molding, as is used for example in covering the edge of a table or counter top, is notched so that it can be bent at the corners of said top, and the notched faces are undercut to cause said edges to closely abut each other at their upper surfaces. In the method of making said mitered corner, the normally vertical leg of the molding is held in a vertical plane, with the other leg projecting therefrom at an angle of about 120°. The miter cut is then made in said other leg in the vertical direction to yield a notch which is effectively undercut when the legs of the molding are bent from their included angle of 120° to an included angle of 90°.

PATENTED OCT 5 1971 3,610,189

INVENTOR
WILLIAM A. DOEBLING
BY
*Trask, Jenkins & Hanley*
ATTORNEYS

METHOD OF MAKING A MITER JOINT

This application is a divisional application of my copending application, Ser. No. 796,043, filed Feb. 3, 1969, now abandoned.

BACKGROUND OF THE INVENTION

This invention relates to the method of making, and the configuration of, miter joints at the corners of a strip of metal molding such as may be used to cover the edges of table or counter tops. The molding, as it is finally mounted on said top, may take the form of an L-shaped strip having a vertical leg which covers the outer face of the top and a horizontal portion which covers the upper edge of said top. The horizontal portion is provided with 90° notches at the corners to form miter joints thereat.

Many times it is difficult to notch the molding properly so as to provide a joint having notched edges which lie flush against each other without leaving any gaps. It is thus an object of this invention to provide a new configuration of miter joints, and to provide an improved method of forming said joints.

SUMMARY OF THE INVENTION

In accordance with one form of the invention a miter joint is provided for an L-shaped strip of bendable molding. Although the legs are normally at right angles with each other, the molding is notched while the included angle between them is held at about 120°. The notching tool is driven through the leg to be notched in a direction parallel to the other leg. It will thus be seen that when the two legs are bent to provide a 90° included angled between them the resultant notch is narrower at the upper face of the notched leg than at the lower face, thereby providing the desirable undercut.

The unnotched leg of the molding is then placed against the outer face of a table or counter top and the notched leg is placed on the upper edge of the top. The molding is bent to conform to the corner on which it is to be mounted with the unnotched leg conforming to the corners of the table and the notched leg forming a miter joint thereat. The notched edges result in the sharp edges at the upper portions of the notched legs contacting each other. This causes the major portion of the notched faces to be spaced from each other while their upper edges permit a close fit therebetween without any gaps.

BRIEF DESCRIPTION OF THE DRAWING

The accompanying drawing illustrates the invention. In such drawing.

BRIEF DESCRIPTION OF THE PREFERRED EMBODIMENT

Figure 1:
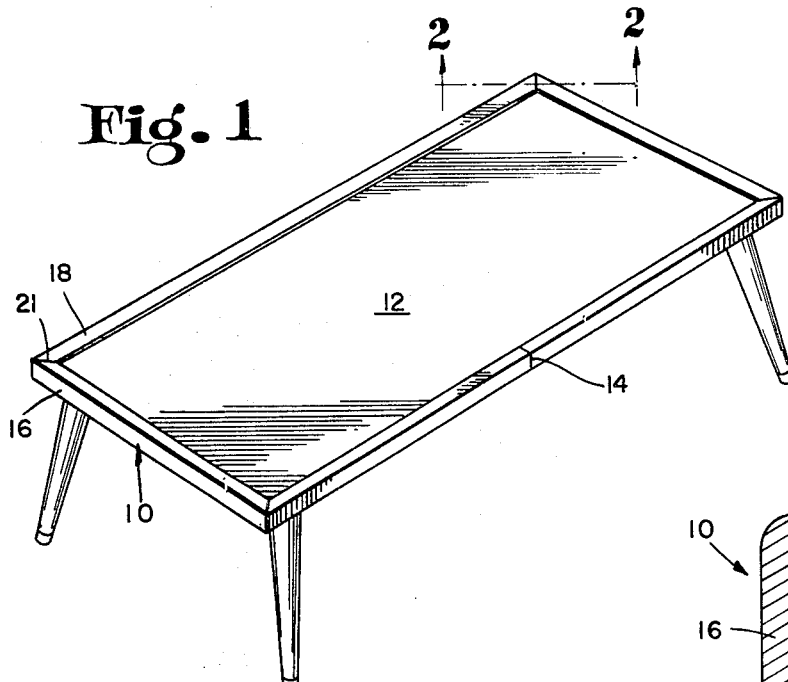
FIG. 1 is an isometric view of a table embodying this invention and having a strip of L-shaped molding applied to its edges.
Figure 2:
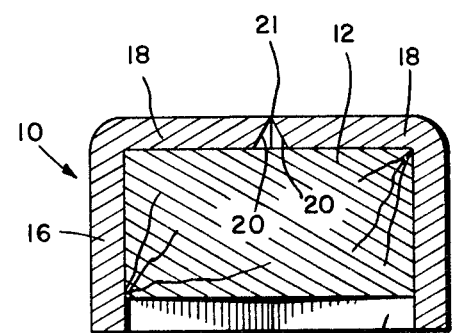
FIG. 2 is an enlarged sectional view taken along line 2—2 of Fig. 1.

As shown in Fig. 1 a strip of L-shaped molding 10 is attached to the edges of a table top 12, with its ends 14 abutting and fastened together in any desired manner. The molding 10 is formed by a face portion or vertical leg 16 which lies against the outer face of the table top, and an upper portion or substantially horizontal leg 18 which covers the upper edge of the top. At each corner of the table top the vertical leg 16 of the molding is bent at right angles to conform to such corner, and the horizontal leg 18 is provided with a notch which extends outwardly from the juncture of the legs to provide a close fitting miter joint. Each miter joint, as shown in Fig. 2, has notched faces 20 in the leg 18 which are under cut to provide a close fit. That is, the faces 20 on the leg 18, which result from the notching operation, are slanted outwardly from top to bottom, so that when the molding is bent at the corners to form the miter joints, only the resultant sharp edges 21 at the upper portions of the notched faces abut each other. This configuration permits the notched faces 20 to fit together along a continuous line without any gaps therebetween as they are viewed from above.

Figure 3:
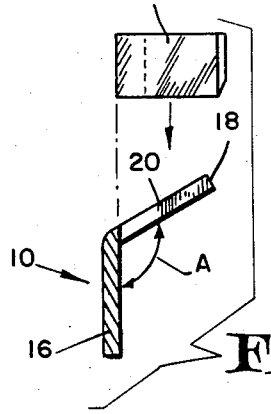
FIG. 3 is an end view of a strip of molding shown in relation to a shearing tool for notching the molding.

Figs. 3–6 illustrate forming the miter joint in which the molding 10 is notched while the leg 18 is bent to form an included angle A with the vertical leg 16 of about 120°. Fig. 3 shows the molding prior to its being notched, ands shows the orientation of a notching tool 22 which is moved parallel with the vertical leg 16 so that the notched faces 20 to be formed in the leg 18 will also be parallel with the vertical leg 16. After the notching operation is completed, the molding is bent to reduce the included angle A between the legs 16 and 18 from 120° to 90°, and the molding is applied to the table top.

Figure 4:
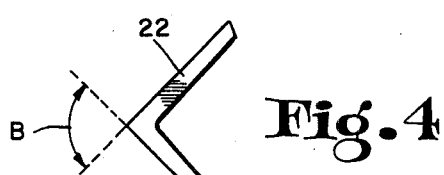
FIG. 4 is a top view of the shearing tool shown in Fig. 3.

For a table having right-angled corners the notch in the molding must form an angle of 90° immediately prior to its application to the table, but the notching tool 22 must have an angle B, as shown in Fig. 4, which is greater than 90°. The angle B is proportional to the angle A and is chosen to yield a 90° notch in the leg 18 after the angle A is changed to the final desired angle of 90°. For example, the angle B of the cutting tool 22 must be about 98.2° when the angle A is 120°.

Figure 6:
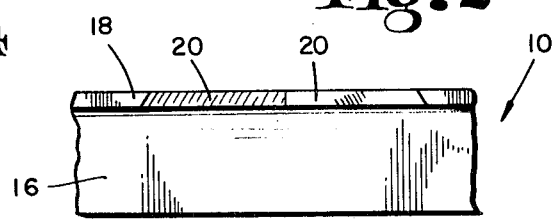
FIG. 6 is a front view of the molding of Fig. 4 shown in an L-shaped configuration.
Figure 5:
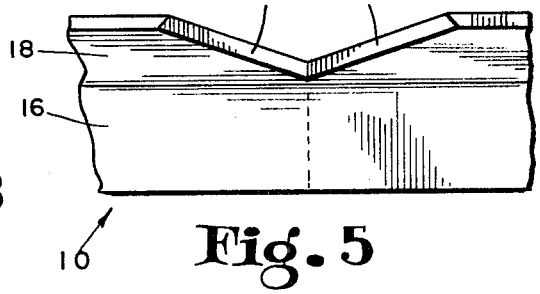
FIG. 5 is a front view of the molding of Fig. 3, shown with a notch therein.

It can be seen that when the angle A is changed from 120° as shown in Fig. 5, to 90° as shown in FIGS. 2 and 6, the notched faces 20 take on an undercut characteristic in that they slant outwardly from top to bottom. Thus, when the molding is bent about the corner of the table, the resultant miter joint provides a continuous line formed by the abutment of the upper edges 21 of the notched faces 20, and there are no unsightly gaps between said faces.

It has been found that 120° is the optimum value for the angle A between the two legs prior to the notching operation when the final included angle between the legs 16 and 18 is to be 90°, but of course other angles can be used with similar effect. The proper angle B for a right-angled joint, and for various A, can be calculated from the formula:

$$2 \arctan \frac{1}{\cos(A-90°)}$$

The configuration of a miter joint as shown and described herein and the method of attaining said configuration, provides substantial advantages due to the minimum number of steps involved in the method, and the eye pleasing result and ease of attaining the configuration.

While the invention has been described as being embodied in a molding whose legs have an included angle of 90° and which is wrapped around a 90° corner, it is to be understood, of course, that any included angle between the legs which is greater than 90° can be employed, and the molding can be wrapped around a corner having any desired angle, all without departing from the spirit and scope of the invention as set forth in the claims appended hereto.

I claim:

1. The method of forming a miter joint corner in a length of molding having first and second angularly disposed legs, comprising the steps of bending said molding to form a first angle between said first and second legs, said first angle being greater than the final desired angle between said legs, cutting a notch in said second leg with a shearing tool by moving said shearing tool in the direction parallel to the plane of said first leg, bending said molding at said first angle to form a second or reduced angle between said first and second legs and bending said molding to form a bend in said first leg and a miter joint corner in said second leg in alignment with said bend.

2. The invention as set forth in claim 1, in which said notch is cut at an angle greater than the angle of said miter joint corner.

3. The invention as set forth in claim 2, in which said first angle is about 120° prior to the step of cutting the notch, and said second or final angle is about 90°.

4. The method of forming a miter joint corner in molding, comprising the steps of bending said molding along its length to form a pair of legs disposed at a first angle with respect to each other, undercutting a notch in one of said legs wherein the adjacent faces of said one leg at said notch slant in opposing directions, and reducing said first angle to a smaller second angle, and bending said molding at said notch to form a corner construction with the resultant sharp edges of the undercut molding faces abutting each other to form a continuous line at said corner.

5. The method of forming a miter joint in a strip of molding for a right-angle corner, comprising the steps of bending the molding along its length to form first and second legs disposed at an angle A with respect to each other, said angle A being greater than 90°, cutting an angular notch in said first leg, wherein the relationship between angles A and B is defined by the equation angle $B = 2 \arctan 1/(A-90°)$, then reducing angle A to 90° and bending said second leg at said notch to form a right-angle corner with the resultant undercut notched edges of the molding abutting each other to form a continuous line at said corner.